US011787248B2

(12) United States Patent
Giaier et al.

(10) Patent No.: US 11,787,248 B2
(45) Date of Patent: Oct. 17, 2023

(54) MODULAR DOUBLE PIN LOAD SENSING HITCHES INCLUDING TWO-PIECE PIN MOUNTS

(71) Applicants: Ford Global Technologies, LLC, Dearborn, MI (US); Methode Electronics, Inc., Chicago, IL (US)

(72) Inventors: Kevin Stanton Giaier, Sylvan Lake, MI (US); Andrew Niedert, New Hudson, MI (US); Elliott Pearson, Shelby Township, MI (US); Anton Rogness, Dearborn, MI (US); Johannes Gießibl, Amerang (DE); Chad Reed, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/614,988

(22) PCT Filed: Jun. 1, 2020

(86) PCT No.: PCT/US2020/035552
§ 371 (c)(1),
(2) Date: Nov. 29, 2021

(87) PCT Pub. No.: WO2020/243703
PCT Pub. Date: Dec. 3, 2020

(65) Prior Publication Data
US 2022/0242180 A1 Aug. 4, 2022

Related U.S. Application Data

(60) Provisional application No. 62/854,799, filed on May 30, 2019.

(51) Int. Cl.
*B60D 1/48* (2006.01)

(52) U.S. Cl.
CPC .................................. *B60D 1/485* (2013.01)

(58) Field of Classification Search
CPC ............................... B60D 1/248; B60D 1/485
See application file for complete search history.

(56) References Cited

U.S. PATENT DOCUMENTS

| 6,527,292 B2 * | 3/2003 | Adair ...................... B60D 1/54 280/491.3 |
| 7,568,718 B1 | 8/2009 | Thomas |

(Continued)

FOREIGN PATENT DOCUMENTS

| WO | 2018171937 | 9/2018 |
| WO | 2020243703 | 12/2020 |

OTHER PUBLICATIONS

International Searching Authority, "International Search Report and Written Opinion," dated Aug. 25, 2020 in connection with International Patent Application No. PCT/US2020/35552, 14 pages.

*Primary Examiner* — Kevin Hurley
(74) *Attorney, Agent, or Firm* — Lorne Forsythe; Hanley, Flight & Zimmerman, LLC

(57) ABSTRACT

Modular double pin load sensing hitches including two-piece pin mounts are disclosed herein. An example apparatus disclosed herein includes a pin mount including a first piece, and a second piece, separate from and to be disposed opposite to the first piece. The apparatus further includes and a receiver tube including a first mounting ear to be coupled to the first piece via a first pin and a second mounting ear to be coupled to the second piece via a second pin.

20 Claims, 5 Drawing Sheets

(56) References Cited

U.S. PATENT DOCUMENTS

| | | | |
|---|---|---|---|
| 8,091,913 B1 | 1/2012 | White | |
| 8,998,240 B2* | 4/2015 | Boittin | A01B 59/002 |
| | | | 280/495 |
| 10,589,583 B2* | 3/2020 | Niedert | B60D 1/62 |
| 11,524,534 B2* | 12/2022 | Giaier | B60D 1/485 |
| 2002/0171225 A1 | 11/2002 | Adair | |
| 2007/0080516 A1* | 4/2007 | Simmons | B60D 1/40 |
| | | | 280/479.3 |
| 2011/0272919 A1 | 11/2011 | Dague et al. | |
| 2012/0112433 A1 | 5/2012 | Williams, Jr. et al. | |
| 2016/0311281 A1 | 10/2016 | Mantovani | |
| 2017/0181366 A1 | 6/2017 | Fay, II | |
| 2020/0198422 A1* | 6/2020 | Niedert | B60D 1/485 |
| 2021/0039457 A1* | 2/2021 | Niedert | B60D 1/485 |
| 2022/0250427 A1* | 8/2022 | Kirtland | B60D 1/485 |

* cited by examiner

MODULAR DOUBLE PIN LOAD SENSING HITCHES INCLUDING TWO-PIECE PIN MOUNTS

RELATED APPLICATION

This patent claims the benefit of U.S. Provisional Application Ser. No. 62/854,799, titled "METHODS AND APPARATUS FOR A MODULAR DOUBLE PIN LOAD SENSING HITCH INCLUDING A TWO PIECE PIN MOUNT," filed May 30, 2019, which is incorporated herein by reference in its entirety.

FIELD OF THE DISCLOSURE

This disclosure relates generally to vehicle hitches and, more particularly, to modular double pin load sensing hitches including two-piece pin mounts.

BACKGROUND

In recent years, consumer vehicles have increasingly been used for towing or hauling cargo. Consumer vehicles often have limits associated with the payloads capable of being hauled and towed by the vehicles. Operating outside of these limits can cause unnecessary wear and/or damage to the vehicle. Consumer vehicles capable of pulling trailers have implemented additional data processing capabilities.

Different vehicle models often have different configurations, including spare tire placement, fuel tank placement, floorboard height, frame rail spacing, etc. As a result, the hitch design may vary significantly between model types. Regardless of the specific model of a vehicle, vehicle hitches generally include a receiver tube and a crossbar. The receiver tube of a hitch is used to couple a towing element (e.g., a hitch ball, a drawbar, etc.) to the vehicle. A crossbar is a tube connecting the driver and passenger sides of a vehicle to the receiver tube. Crossbars often have simple geometric cross-sections, such as a circle or a square.

SUMMARY SECTION

An example apparatus disclosed herein includes a pin mount including a first piece; and a second piece, separate from and to be disposed opposite to the first piece, and a receiver tube including a first mounting ear to be coupled to the first piece via a first pin, and a second mounting ear to be coupled to the second piece via a second pin.

An example hitch disclosed herein includes a first pin, a pin mount defining a saddle, the pin mount including a first piece and a second piece, separate from and opposite to the first piece, a crossbar disposed within the saddle, and a receiver tube coupled to the pin mount via the first pin.

An example apparatus disclosed herein includes a mounting plate, a first boss, extending from the mounting plate, the first boss including a first opening, and a second boss extending from the mounting plate, the second boss including a second opening aligned with the first opening, the first boss and the second boss configured to receive a load-sensing pin of a trailer hitch.

Figure 1:
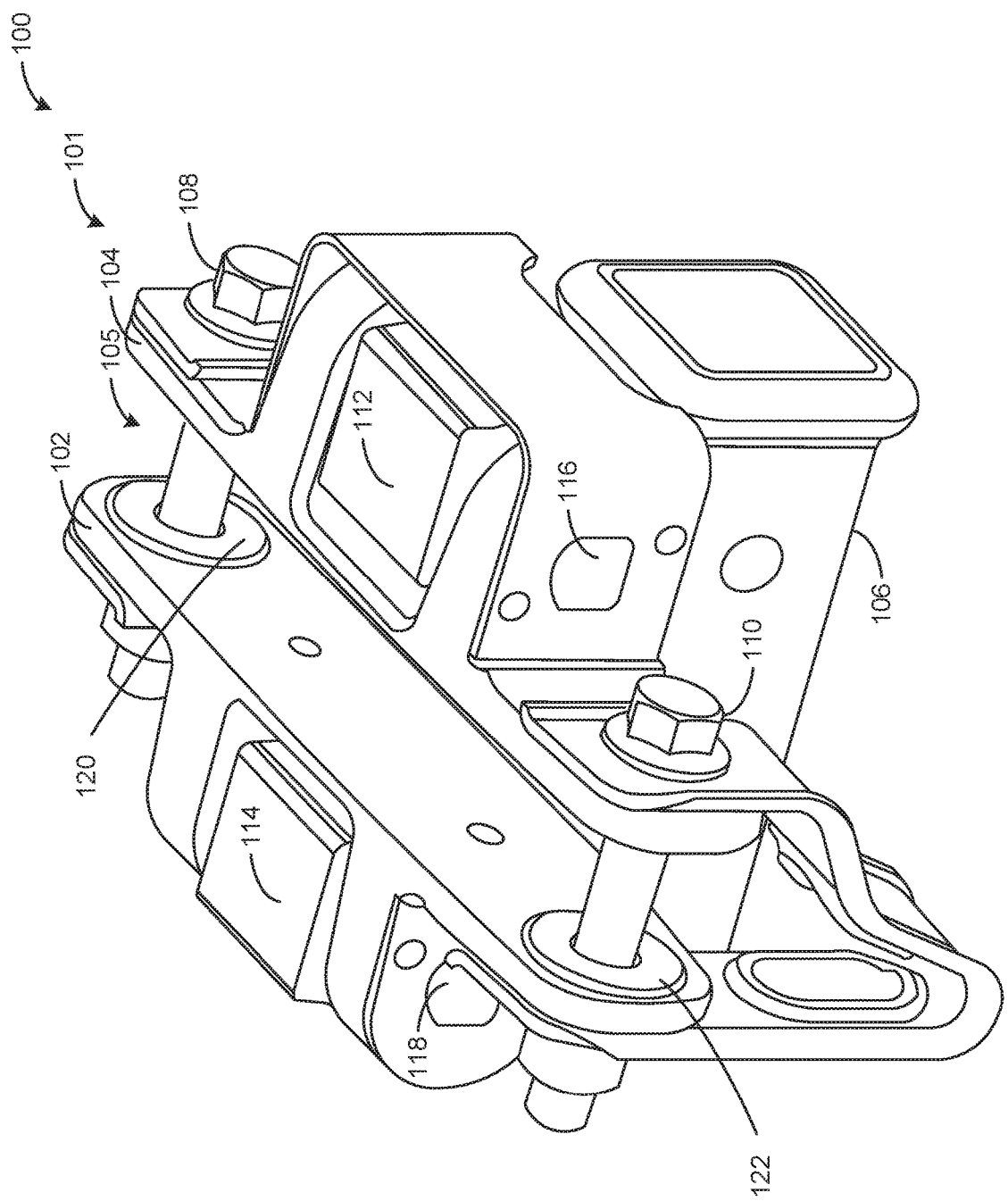
FIG. 1 illustrates a pin housing assembly to be coupled to a crossbar including a two-piece pin mount.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many vehicle hitch designs are specific to individual vehicle models and, thus, can require the hitch to have unique shapes and parts specific to each vehicle model. Variations in hitch design between vehicle models can be attributed to the shape of the rear bumper housing, packaging requirements for the spare tire, floorboard height, frame rail spacing, etc. These variations in hitch design can make it difficult to package force-sensing elements (e.g., pins, strain gauge, etc.) into a hitch. For example, each hitch design can require specifically designed force-sensing elements, which can increase manufacturing cost and reduce the availability of replacement parts.

In some examples disclosed herein, load-sensing pins are used to determine the load condition of a trailer on a vehicle. Other load-sensing elements such as pressure sensors, piezoelectric sensors, etc. are specifically tailored to the hitch (e.g., the hitch ball diameter, etc.) or the interaction between the vehicle and the trailer (e.g., ride height differences between the vehicle and trailer, etc.). Because hitch ball diameter and/or drawbar cross-sectional area varies with the coupled trailer, the use of pressure sensors and piezoelectric sensors may not be practical. Accordingly, the examples disclosed herein include load-sensing pins that can be implemented on any vehicle and trailer configuration.

In some examples, a single-piece casting can be used to support the multiple load-sensing pins. A single-piece casting allows a load applied to the receiver tube (e.g., by towing a coupled trailer, etc.) to be transferred to the load-sensing pins via the single-piece structure. Using a single-piece structure, the distance between the pins and the distance between the crossbar mounting faces is fixed. In some examples, the two halves of the single-piece structure react to bolt tension loads from a coupled crossbar and act as a clevis with an associated spring rate. In some examples, the area of the structure between the mounting faces of the single-piece casting is referred to as the "saddle." In some examples, the width of the saddle is design-dependent and cannot be changed after manufacture. That is, the width of the saddle is fixed during machining and cannot be modified based on the particular crossbar to be coupled to the structure during assembly.

Clearance issues between the crossbar and the mounting faces can cause distortion(s) in the pin mount or pins. In some examples, the distortion occurs in the saddle of the pin mount and can cause stress to be applied to the pins by the pin mount. In some examples, the stress applied to the pins by the distortion can reduce the effective sensing range of the load-sensing pins. In some examples, the stress applied to the pins by the distortion can prevent the pins from being calibrated on a fixture and later installed on a vehicle without further on-vehicle calibration. That is, calibration of the pin mount depends on the clearance between the pin mount and the crossbar. Thus, each pin mount must be calibrated to the particular crossbar to which the pin mount is to be coupled.

Examples disclosed herein overcome the above-noted issues by using a two-piece pin mount. In some examples disclosed herein, the two-piece pin mount enables the pin housing to be calibrated using a calibration fixture during manufacturing of the pin mount without the need to be calibrated to a particular crossbar on-vehicle. In some examples disclosed herein, the pin mount allows use of a two-way four-way locating strategy to be implemented during calibration. In some examples disclosed herein, the crossbar coupling includes shouldered crush sleeves with a controlled outer diameter. In such examples, the inner diameters of the crush sleeves allow installation fasteners (e.g., bolts) to be inserted into the pin mount and the outer diameters of the crush sleeves interface with the pin mount to locate each piece relative to the other. In some examples disclosed herein, utilization of the two-piece pin mounts reduces assembly mass, cost, and machining time when compared to single-piece pin mounts.

FIG. 1 illustrates an example pin housing assembly 100 to be coupled to a crossbar including a pin mount 101. The example pin mount 101 includes an example first piece 102 and an example second piece 104 that together define an example saddle 105. The example pin mount 101 is coupled to an example receiver tube 106. In the illustrated example of FIG. 1, the first piece 102 and the second piece 104 are coupled together via an example first fastener 108 and an example second fastener 110. The first piece 102 is coupled to an example first mounting ear 112 and the second piece 104 is coupled to an example second mounting ear 114. In the illustrated example of FIG. 1, a load-sensing pin can be coupled to the first piece 102 and the first mounting ear 112 via an example first aperture 116. In the illustrated example of FIG. 1, a load-sensing pin can be coupled to the second piece 104 and the second mounting ear 114 via an example second aperture 118. In some examples, the pin housing assembly 100 enables a two-way four-way locating strategy to be used during assembly (e.g., locating via the 3-2-1 principle, etc.). While one example configuration of the pin housing assembly 100 is illustrated in FIG. 1, the teachings of this disclosure can be implemented by any other suitable configuration of the pin housing assembly 100.

The first piece 102 and the second piece 104 are parts of the pin mount 101. In the illustrated example, the pieces 102, 104 are separate parts and are disposed opposite to each other. In some examples, the first piece 102 and/or the second piece 104 are unitary cast parts and are composed of ductile iron (e.g., D450, D4512, etc.). In other examples, first piece 102 and the second piece 104 can be composed of metal or any combination of metals (e.g., steel, ductile iron, aluminum, etc.), composites (e.g., carbon fiber, etc.), plastics and/or any other suitable materials. The example pieces 102, 104 are described in greater detail below in conjunction with FIGS. 2 and 3.

The saddle 105 is the gap formed between the first piece 102 and the second piece 104. In some examples, the width of the saddle (e.g., the distance between mounting faces 201, 203 of the first piece 102 and the second piece 104, etc.) can change based on the configuration of the pin housing assembly 100. In some examples, the width of the saddle 105 can be configured during calibration of the pin housing assembly 100. For example, the width of the saddle 105 can be configured based on the size of the crossbar to be coupled to the pin housing assembly 100. In other examples, the width of the saddle 105 can be fixed based on the length of the fasteners 108, 110.

The receiver tube 106 enables a trailer to be coupled to a vehicle via the pin housing assembly 100. For example, a tow ball can be coupled to the pin housing assembly 100 via the receiver tube 106. The coupled tow ball enables a trailer to be pivotally coupled to the pin housing assembly 100. In other examples, any other suitable coupling element (e.g., a tow bar, etc.) can be coupled to the receiver tube 106. In some examples, the pin housing assembly 100 can be further coupled to a trailer via one or more chains. In some examples, the receiver tube 106 is composed of high strength low alloy steel (HSLA) (e.g., hot-rolled (HR) A50, etc.). In other examples, receiver tube 106 can be composed of another metal or any combination of metals (e.g., steel, ductile iron, aluminum, etc.), composites (e.g., carbon fiber, etc.), plastics and/or any other suitable materials. In some examples, the receiver tube 106 can be coated via an electrophoretic painting process (E-coating) (e.g., ESGCP1-1B332-AB, etc.). In other examples, the receiver tube 106 is not coated or is coated with any other suitable coating (e.g., paint, zinc, zinc-nickel, composite, etc.).

The first fastener 108 and the second fastener 110 enable the pin housing assembly 100 to be coupled to a crossbar. In some examples, the first fastener 108 and the second fastener 110 are bolts. In other examples, the first fastener 108 and/or the second fastener 110 can be any other suitable type of fastener (e.g., screw, etc.). In the illustrated example of FIG. 1, the first fastener 108 and the second fastener 110 can be coupled to the first piece 102 and the second piece 104 via example crush sleeves 120, 122, respectively. In some examples, one or both of the crush sleeves can be a shouldered crush sleeve, a crush collar, etc. The example crush sleeves 120, 122 interface with the first piece 102 and the second piece 104, respectively, to allow the first piece 102 and the second piece to be located relative to each other during the calibration.

The first mounting ear 112 and the second mounting ear 114 enable a load-sensing pin to be coupled to the pin housing assembly 100. In some examples, the first mounting ear 112 and the first piece 102 form a clevis fastener when a pin is inserted into the first aperture 116. In some examples, the second mounting ear 114 forms a clevis fastener when a pin is inserted into the second aperture 118. In some examples, the first mounting ear 112 and/or the second mounting ear 114 are composed of steel (e.g., 1018 steel, etc.). In other examples, the first mounting ear 112 and/or the second mounting ear 114 can be composed of another metal or any combination of metals (e.g., steel, ductile iron, aluminum, etc.), composites (e.g., carbon fiber, etc.), plastics and/or any other suitable materials. The example first mounting ear 112, the example second mounting ear 114, and the example receiver tube 106 are described in greater detail below in conjunction with FIG. 4.

Figure 2:
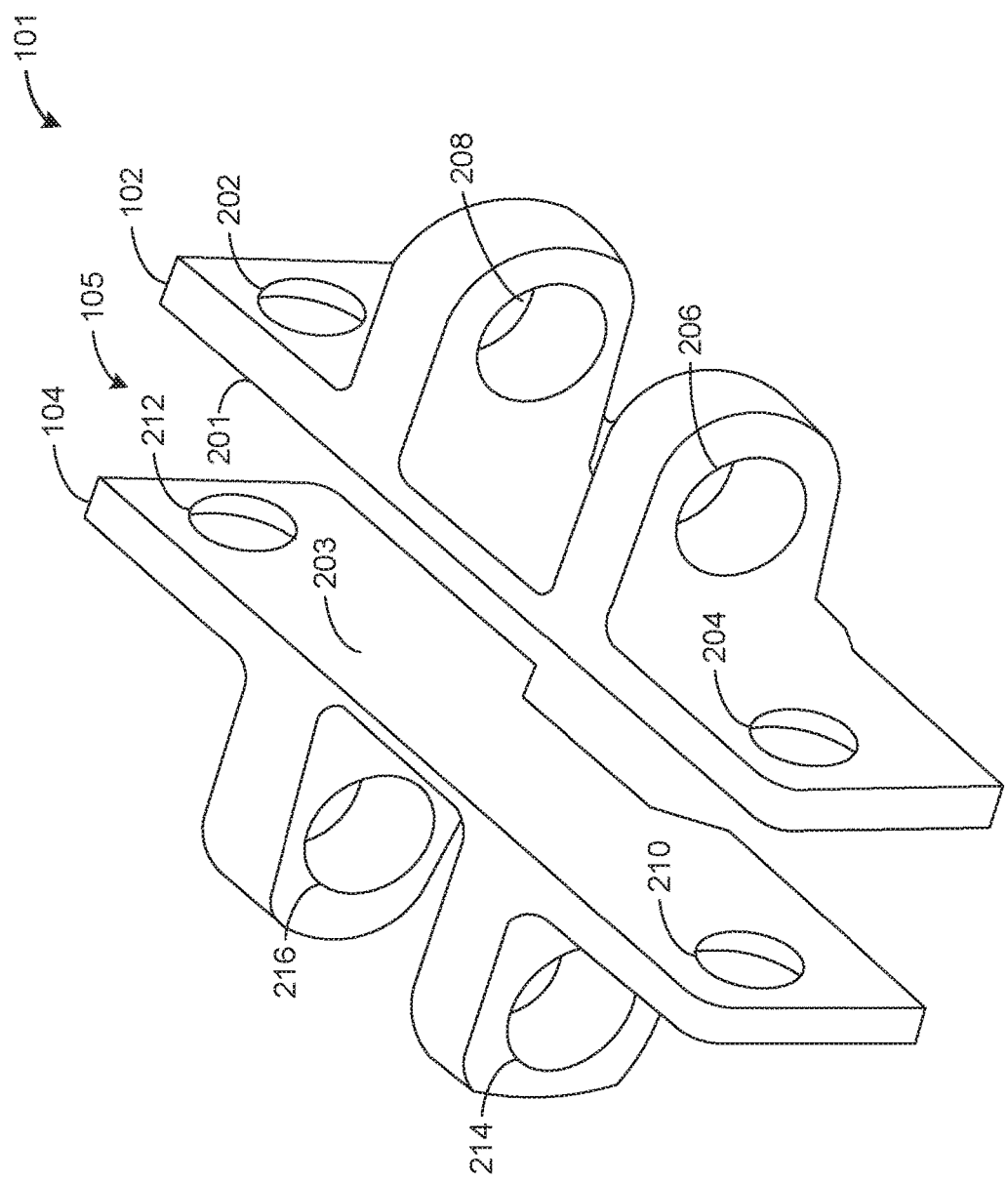
FIG. 2 is an isometric view of the example two-piece pin mount of FIG. 1.

FIG. 2 is an isometric view of the example pin mount 101 of FIG. 1. The example pin mount 101 includes the first piece 102 with an example first mounting face 201 and the second piece 104 with an example second mounting face 203 of FIG. 1. In the illustrated example of FIG. 2, the first piece 102 includes an example first opening or hole 202, an example second opening or hole 204, an example third opening or hole 206 and an example fourth opening or hole 208. In the illustrated example of FIG. 2, the example second piece 104 includes an example fifth opening or hole 210, an example sixth opening or hole 212, an example seventh opening or hole 214, and an example eighth opening or hole 216.

In the illustrated example of FIG. 2, the distance between the mounting faces 201, 203 (e.g., the width of the saddle 105, etc.) can be controlled via fasteners coupled via the holes 202, 204, 210, 212 (e.g., the fasteners 108, 110 of FIG. 1, etc.). In such examples, the distance between the mounting faces 201, 203 can be configured to accommodate different crossbar widths (e.g., different models of crossbars, varying tolerancing of crossbar, etc.). In some examples, some or all of the holes 202, 204, 210, 212 can include one or more crush sleeves. In other examples, some of all of the holes 202, 204, 210, 212 can include any other hardware to assist in locating the first piece 102 and the second piece 104 relative to each other. In the illustrated example of FIG. 2, the third and fourth holes 206, 208 of the first piece 102 enable the first piece 102 to act as a clevis when coupled to the mounting ear 112. In the illustrated example of FIG. 2, the seventh and eighth holes 214, 216 enable the second piece 104 to act as a clevis when coupled to the mounting ear 114.

Figure 3:
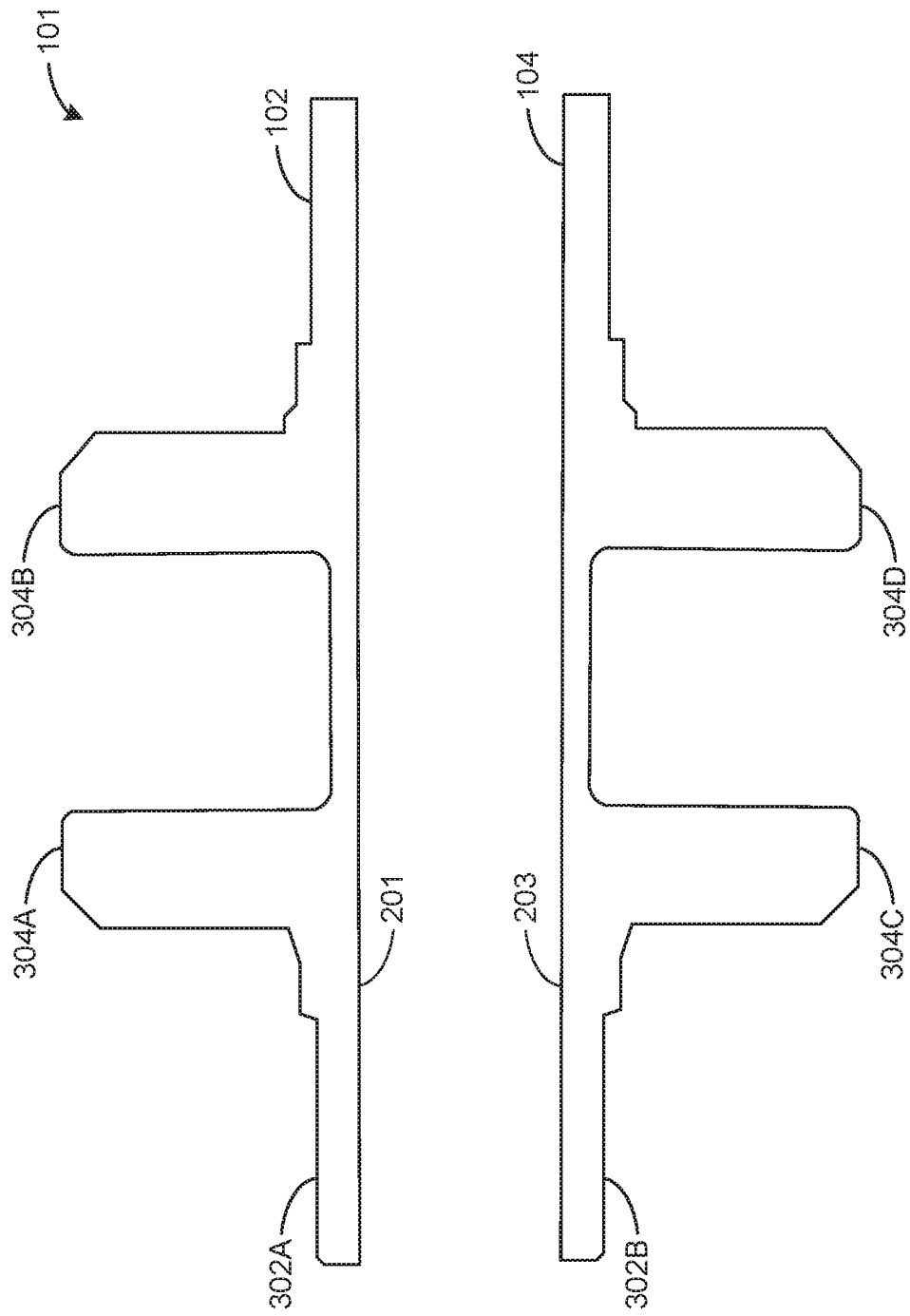
FIG. 3 is a top view of the example two-piece pin mount of FIG. 1.

FIG. 3 is a top view of the example pin mount 101 of FIG. 1. In the illustrated example of FIG. 3, the first piece 102 includes a planar section or mounting plate 302A and a first boss 304A and a second boss 304B extending therefrom. The second piece 104 has a shape symmetric relative to the first piece 102 and includes a second planar section or mounting plate 302B and a third boss 304C and a fourth boss 304D extending therefrom. In the illustrated example of FIG. 3, the first mounting plate 302A and the second mounting plate 302B include the first mounting face 201 and the second mounting face 203, respectively. In other examples, the first piece 102 and/or the second piece 104 can have any other suitable shape. In some examples, the pin mount 101 can be composed of more than two parts (e.g., three parts, four parts, etc.).

Figure 4:
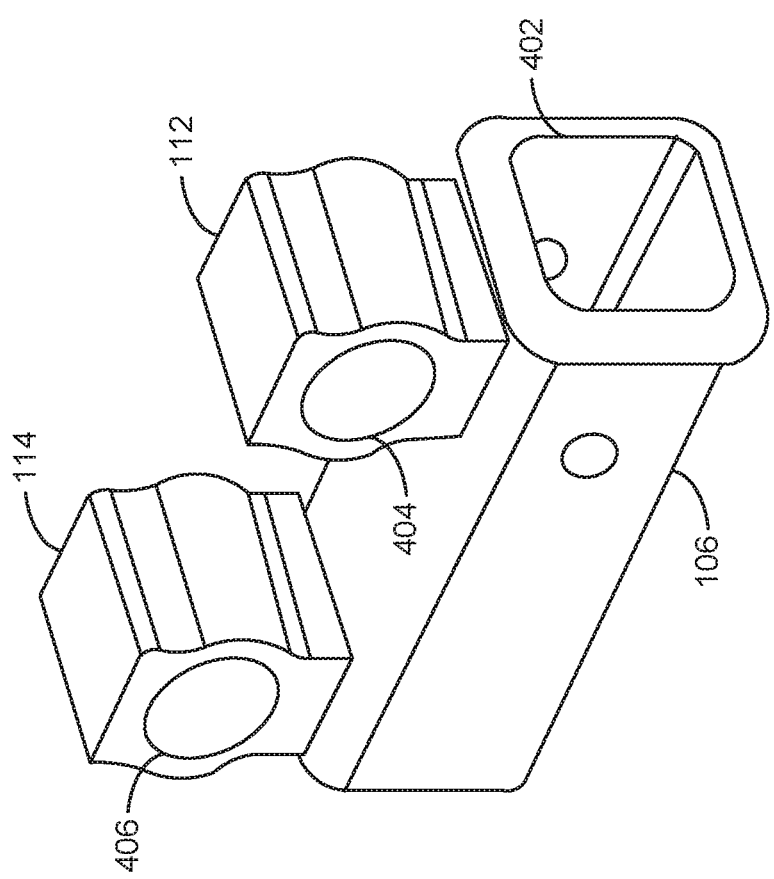
FIG. 4 is an isometric view of the example receiver tube of FIG. 1.

FIG. 4 is an isometric view of the receiver tube 106 of FIG. 1. In the illustrated of FIG. 4, the example receiver tube 106 includes the first mounting ear 112 and the second mounting ear 114. The receiver tube 106 includes an example trailer inlet 402. In the illustrated example of FIG. 4, the first mounting ear 112 includes an example first opening or hole 404 and the second mounting ear 114 includes an example second opening or hole 406.

Figure 5:
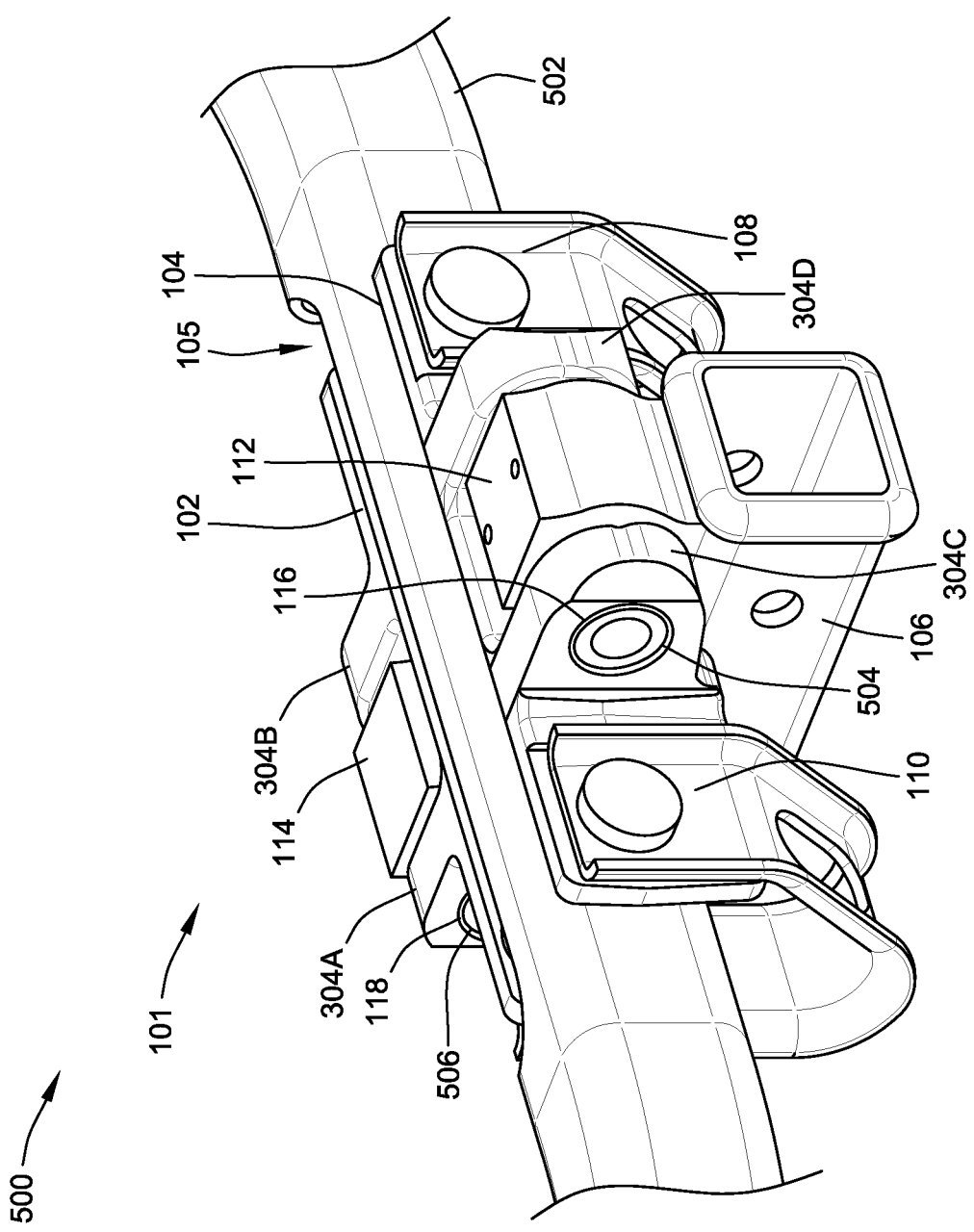
FIG. 5 is an isometric view of the pin housing assembly of FIG. 1 coupled to a crossbar and including load-sensing pins.

FIG. 5 is an isometric view of the pin housing assembly 100 of FIG. 1 coupled to an example crossbar 500 and including an example first load-sensing pin 504 and an example second load-sensing pin 506. In the illustrated example of FIG. 5, the crossbar 500 is disposed within the saddle 105 formed between the first piece 102 and the second piece 104. The crossbar 500 is coupled to the pin housing assembly 100 via the fasteners 108, 110. The crossbar 500 is disposed between the mounting faces 201, 203. In the illustrated example of FIG. 5, the first load-sensing pin 502 is coupled to the first piece 102 and the first mounting ear 112 via the first aperture 116. In the illustrated example of FIG. 5, the second load-sensing pin 506 is coupled to the second piece 104 and the second mounting ear 114 via the second aperture 118.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Example methods, apparatus, systems, and articles of manufacture to modular double pin load sensing hitches including two-piece pin mounts are disclosed herein. Further examples and combinations thereof include the following:

Example 1 includes an apparatus to be coupled to a hitch crossbar, the apparatus comprising a pin mount including a first piece, and a second piece, separate from and to be disposed opposite to the first piece, and a receiver tube including a first mounting ear to be coupled to the first piece via a first pin, and a second mounting ear to be coupled to the second piece via a second pin.

Example 2 includes the apparatus of example 1, wherein at least one of the first pin or the second pin are load-sensing pins.

Example 3 includes the apparatus of example 1, further including a first fastener, and a second fastener, the first fastener and the second fastener coupling the first piece to the second piece.

Example 4 includes the apparatus of example 3, wherein the first piece includes a first mounting face and the second piece includes a second mounting face, a distance between the first mounting face and the second mounting face based on a length of at least one of the first fastener or the second fastener.

Example 5 includes the apparatus of example 3, wherein (1) the first fastener is disposed within a first opening of the first piece and a second opening of the second piece and (2) the second fastener is disposed with a third opening of the first piece and a fourth opening of the second piece, and the apparatus further including a crush sleeve disposed in at least one of the openings.

Example 6 includes the apparatus of example 1, wherein the first pin, the first piece and the first mounting ear form a first clevis and the second pin, the second piece, and the second mounting ear form a second clevis.

Example 7 includes the apparatus of example 1, wherein a configuration of the first piece and the second piece enables the apparatus to be calibrated on a fixture during manufacture.

Example 8 includes a hitch comprising a first pin, a pin mount defining a saddle, the pin mount including a first piece, and a second piece, separate from and opposite to the first piece, a crossbar disposed within the saddle, and a receiver tube coupled to the pin mount via the first pin.

Example 9 includes the hitch of example 8, wherein the receiver tube includes a first mounting ear and a second mounting ear and further includes a second pin coupling the second mounting ear to the second piece, the first pin coupling the first mounting ear to the first piece.

Example 10 includes the hitch of example 9, wherein the first pin, the first piece and the first mounting ear form a first clevis and the second pin, the second piece, and the second mounting ear form a second clevis.

Example 11 includes the hitch of example 8, further including a first fastener, and a second fastener, the first fastener and the second fastener coupling the first piece to the second piece.

Example 12 includes the hitch of example 11, wherein the first piece includes a first mounting face and the second piece includes a second mounting face, a distance between the first mounting face and the second mounting face based on a length of at least one of the first fastener or the second fastener.

Example 13 includes the hitch of example 11, further including a crush sleeve disposed within an opening of the first piece, the first fastener extending through the crush sleeve.

Example 14 includes the hitch of example 8, wherein a configuration of the pin mount enables the pin mount to be calibrated on a fixture during manufacture.

Example 15 includes the hitch of example 8, wherein the first pin is a load-sensing pin.

Example 16 includes an apparatus comprising, a mounting plate, a first boss, extending from the mounting plate, the first boss including a first opening, and a second boss extending from the mounting plate, the second boss including a second opening aligned with the first opening, the first boss and the second boss configured to receive a load-sensing pin of a trailer hitch.

Example 17 includes the apparatus of example 16, wherein the mounting plate, the first boss, and the second boss are unitary cast part.

Example 18 includes the apparatus of example 16, wherein the mounting plate includes a mounting face, a third opening disposed on the mounting face, and a fourth opening disposed on the mounting face.

Example 19 includes the apparatus of example 18, wherein the mounting plate is configured to receive a first fastener via the third opening and a second fastener via the fourth opening, the first fastener and the second fastener extending from a piece of a pin mount of the trailer hitch.

Example 20 includes the apparatus of example 19, wherein a distance between the mounting face and the piece of the pin mount is based on a length of at least one of the first fastener and the second fastener.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to be coupled to a hitch crossbar, the apparatus comprising:
   a pin mount including:
      a first piece; and
      a second piece, separate from and to be disposed opposite to the first piece; and
   a receiver tube including:
      a first mounting ear to be coupled to the first piece via a first pin;
      a second mounting ear to be coupled to the second piece via a second pin;
   a first fastener disposed within a first opening of the first piece and a second opening of the second piece; and
   a second fastener disposed within a third opening of the first piece and a fourth opening of the second piece, and the apparatus further including a crush sleeve disposed in at least one of the openings.

2. The apparatus of claim 1, wherein at least one of the first pin or the second pin are load-sensing pins.

3. The apparatus of claim 2, wherein the crush sleeve is at least one of a shouldered crush sleeve or a crush collar.

4. The apparatus of claim 1, wherein the first pin, the first piece and the first mounting ear form a first clevis and the second pin, the second piece, and the second mounting ear form a second clevis.

5. The apparatus of claim 1, wherein the first piece includes a first mounting face and the second piece includes a second mounting face, a distance between the first mounting face and the second mounting face based on a length of at least one of the first fastener or the second fastener.

6. A hitch comprising:
   a first pin;
   a pin mount defining a saddle, the pin mount including:
      a first piece; and
      a second piece, separate from and opposite to the first piece;
   a crossbar disposed within the saddle; and
   a receiver tube coupled to the pin mount via the first pin, wherein the first pin is a load-sensing pin.

7. The hitch of claim 6, wherein the receiver tube includes a first mounting ear and a second mounting ear and further includes a second pin coupling the second mounting ear to the second piece, the first pin coupling the first mounting ear to the first piece.

8. The hitch of claim 7, wherein the first pin, the first piece and the first mounting ear form a first clevis and the second pin, the second piece, and the second mounting ear form a second clevis.

9. The hitch of claim 6, further including:
a first fastener; and
a second fastener, the first fastener and the second fastener coupling the first piece to the second piece.

10. The hitch of claim 9, wherein the first piece includes a first mounting face and the second piece includes a second mounting face, a distance between the first mounting face and the second mounting face based on a length of at least one of the first fastener or the second fastener.

11. The hitch of claim 9, further including a crush sleeve disposed within an opening of the first piece, the first fastener extending through the crush sleeve.

12. An apparatus comprising,
a mounting plate to abut a crossbar of a trailer hitch;
a first boss, extending from the mounting plate, the first boss including a first opening; and
a second boss extending from the mounting plate, the second boss including a second opening aligned with the first opening, the first boss and the second boss configured to receive a load-sensing pin of the trailer hitch.

13. The apparatus of claim 12, wherein the mounting plate, the first boss, and the second boss form a unitary cast part.

14. The apparatus of claim 12, wherein the mounting plate includes:
a mounting face;
a third opening disposed on the mounting face; and
a fourth opening disposed on the mounting face.

15. The apparatus of claim 14, wherein the mounting plate is configured to receive a first fastener via the third opening and a second fastener via the fourth opening, the first fastener and the second fastener extending from a piece of a pin mount of the trailer hitch.

16. The apparatus of claim 15, wherein a distance between the mounting face and the piece of the pin mount is based on a length of at least one of the first fastener and the second fastener.

17. The apparatus of claim 15, further including a crush sleeve disposed within the third opening, the first fastener extending through the crush sleeve.

18. The apparatus of claim 17, wherein the crush sleeve is at least one of a shouldered crush sleeve or a crush collar.

19. The apparatus of claim 15, wherein the mounting plate, the first boss, and the second boss have a first shape and the piece of the pin mount has a second shape, the first shape symmetric to the second shape.

20. The apparatus of claim 12, wherein the mounting plate is planar.

\* \* \* \* \*